United States Patent [19]

Fassbinder

[11] Patent Number: 4,662,798

[45] Date of Patent: May 5, 1987

[54] METHOD AND A DEVICE FOR MEASURING AND/OR REGULATING THE MASS FLOW OF SOLID PARTICLES

[75] Inventor: Hans-Georg Fassbinder, Sulzbach-Rosenberg, Fed. Rep. of Germany

[73] Assignee: Kloeckner Stahlforschung GmbH, Fed. Rep. of Germany

[21] Appl. No.: 551,400

[22] Filed: Jul. 7, 1983

[30] Foreign Application Priority Data

Jul. 7, 1982 [DE] Fed. Rep. of Germany ....... 3225449

[51] Int. Cl.$^4$ ..................... B65G 51/16; B65G 53/66; G01F 1/42
[52] U.S. Cl. ........................................ 406/14; 406/19; 406/93; 406/173; 73/861.42; 73/861.61
[58] Field of Search .................... 406/12, 14, 19, 93, 406/173, 109; 73/195, 861.04, 861.42, 861.61

[56] References Cited

U.S. PATENT DOCUMENTS

| | | | |
|---|---|---|---|
| 2,580,581 | 1/1952 | Niemitz | 406/173 |
| 2,776,566 | 1/1957 | Schulman et al. | 73/861.04 |
| 3,604,758 | 9/1971 | Flair et al. | 406/93 X |
| 4,198,860 | 4/1980 | King | 73/195 |

FOREIGN PATENT DOCUMENTS

| | | | |
|---|---|---|---|
| 96343 | 6/1963 | Denmark | 406/109 |
| 0032206 | 7/1981 | European Pat. Off. | |
| 811578 | 8/1951 | Fed. Rep. of Germany | 406/14 |
| 1556111 | 3/1970 | Fed. Rep. of Germany | |
| 2925510 | 1/1981 | Fed. Rep. of Germany | |
| 52116 | 3/1983 | Japan | 406/19 |
| 788097 | 12/1957 | United Kingdom | 406/19 |
| 1021645 | 3/1966 | United Kingdom | |
| 1360424 | 7/1974 | United Kingdom | 406/14 |
| 2085388 | 4/1982 | United Kingdom | 406/14 |

OTHER PUBLICATIONS

"Die Feinkalkdosierung in LDAC-Blasstahlwerken", Klepzig Fachberichte, Nov. 1966.

Primary Examiner—Andres Kashnikow
Assistant Examiner—Mary Beth O. Jones
Attorney, Agent, or Firm—Robert J. Koch

[57] ABSTRACT

A method of measuring and/or regulating the mass flow of solid particles in a transported solid particle-gas suspension, the quantity of carrier gas in the solid particle-gas suspension being changed between two constrictions.

15 Claims, 2 Drawing Figures

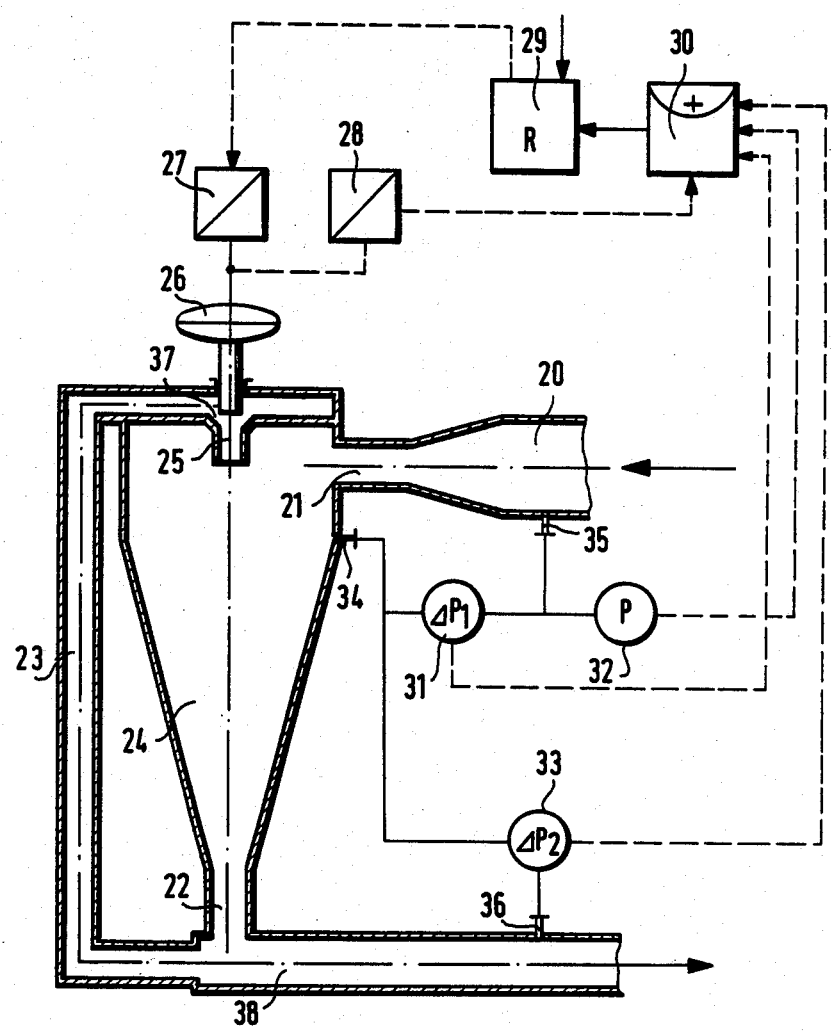

METHOD AND A DEVICE FOR MEASURING AND/OR REGULATING THE MASS FLOW OF SOLID PARTICLES

BACKGROUND OF THE INVENTION

The invention relates to a method and a device for measuring and/or regulating the mass flow of solid particles in a transported solid particle-gas suspension.

The invention is based on the problem of providing a method and a device for measuring and/or regulating the mass flow of solid particles, characterized by simplicity, low constructional expense and great reliability.

SUMMARY OF THE INVENTION

This problem is solved according to the invention by a method of measuring and/or regulating the mass flow of solid particles in a transported solid particle-gas suspension which is characterized by the fact that the quantity of carrier gas in the solid particle-gas suspension is changed between two constrictions and the pressure difference is measured at each constriction.

The device for carrying out the method is characterized by the fact that constrictions are provided in the conveyer pipe line at a distance from each other and a gas pipe for supplying or removing gas opens out into the conveyer pipe line between the constrictions.

The invention is based on the finding that the change in the quantity of carrier gas in a solid particle-gas suspension or the change in the solid particle load of the carrier gas resulting from the change in the quantity of carrier gas, may be the basis for measuring and/or regulating the mass flow of the solid particles.

For the mere measuring of the mass flow, a constant quantity of carrier gas may be supplied to or removed from the suspension between the constrictions. For regulating it, however, the quantity of supplied or removed carrier gas is changed.

In the case of the inventive method of determining and regulating the mass flow of solid particles of a transported solid particle-gas suspension, the quantity of carrier gas in the solid particle-gas suspension is changed between two constrictions, the pressures before and after the constriction are measured at each constriction, and the measured values are combined to determine the mass flow. To regulate the mass flow of the solid particles, the quantity of carrier gas supplied or removed between the constrictions is changed as a function of the mass flow as determined.

In the case of the inventive device for determining and regulating the mass flow of solid particles in a transported solid particle-gas suspension, constrictions are provided in the conveyer pipe line at a distance from each other, a gas pipe for supplying or removing gas opens out into the conveyer pipe line between the constrictions, measuring points are provided with manometers before and after the constrictions, and a control valve is arranged for regulation.

The quantity of supplied or removed carrier gas preferably ranges from 5 to 50% and is preferably around 20%.

According to a preferred embodiment, the removed quantity of carrier gas is supplied to the suspension again after the second constriction.

At the constrictions, pressure measuring devices are provided for measuring the pressure difference at the constrictions, i.e. the difference in pressure before and after the constrictions. Before the first constriction, between the first and the second and after the second constriction, manometers are generally arranged. The values measured by the manometers are used to determine the pressure difference. Further, devices for measuring the supplied or removed quantity of carrier gas are provided.

The inventive method allows for the measuring and, if desired, regulation of the mass flow of solid particles in a simple manner. The inventive device is characterized by constructional simplicity and operating reliability.

BRIEF DESCRIPTION OF THE DRAWINGS

In the following, the invention shall be described in more detail with reference to the drawing, which shows two preferred embodiments. The figures show:

FIG. 2 a schematic view of an embodiment in which carrier gas is removed.

DETAILED DESCRIPTION OF THE PREFERRED EMBODIMENTS

Figure 1:
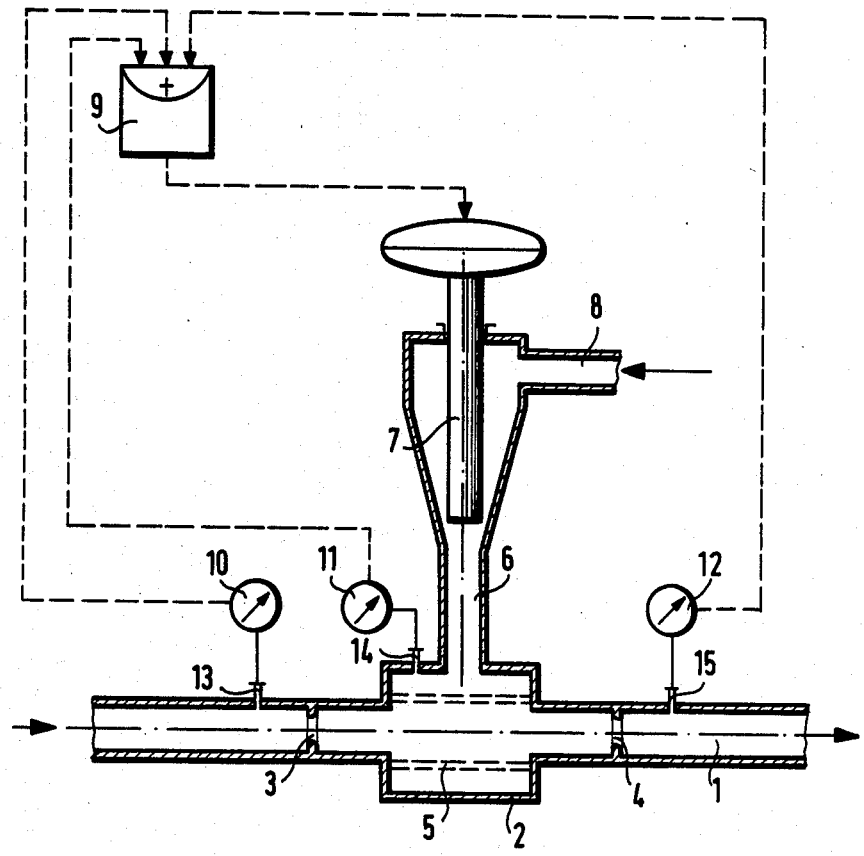
FIG. 1 a schematic view of an embodiment in which carrier gas is supplied.

In the conveyer pipe line 1 shown in FIG. 1 a solid particle-gas suspension flows in the direction of the arrow from the left to the right. There are constrictions 3, 4 provided in the measuring and regulating area, for which well-rounded restrictors or slits are preferred.

Conveyer pipe line 1 includes a collar 2 into which gas pipe 6 opens out. The gas supplied through control valve 7 via pipe 8 flows through gas-permeable filter 5 into the conveyer pipe line. A gas-permeable powder metal is preferably used as a gas-permeable filter. This allows for a gas supply free of turbulence, on the one hand, and prevents accumulation of solid particles, on the other.

The pressure is measured at three measuring points 13, 14 and 15 by means of manometers 10, 11 and 12. These values are fed to computer 9.

If the device is used solely for measuring, a constant quantity of carrier gas flows through gas pipe 6 and computer 9 passes the calculated values along to a display device.

However, if the device is used for regulating, control valve 7 is controlled by computer 9 and different quantities of carrier gas are supplied to conveyer pipe line 1 via pipe 6.

It has been found that the mass flow of the solid particles approximately obeys the following relation in the described device. This simple relation can be derived theoretically. The density of the gas, or the gas mass, was neglected since the solid particle load is generally large compared to the gas density.

$$\dot{m} = \frac{2p \cdot q^2}{p_o \cdot V_o} \cdot (\Delta p_2 - \Delta p_1)$$

$\dot{m}$ = mass flow (kg/s),
p = initial pressure (bar),
q = cross-section of restrictor (m$^2$),
$p_o$ = normal pressure = 1 bar,
$V_o$ = supplied or removed quantity of carrier gas (m$_n^3$/S),
$\Delta p_2$ = pressure difference,
$\Delta p_1$ = pressure difference.

It is apparent that by measuring the initial pressure p and two differential pressures as well as the supplied or removed quantity of carrier gas $V_o$, and without measuring the overall quantity of carrier gas, it is possible to determine the mass flow of the solid particles $\dot{m}$.

The initial pressure p is measured at measuring point 13 with manometer 10. The differential pressure $\Delta p_1$ is that between the initial pressure and the pressure measured by manometer 11 at measuring point 14 after restrictor 3. $\Delta p_2$ is the pressure difference between the pressures measured by manometer 11 at measuring point 14 and by manometer 12 at measuring point 15.

The cross-section of the restrictor q is identical for restrictors 3 and 4, which simplifies the relation. The cross-section of the restrictors may differ in size, however.

The additional quantity of carrier gas is best supplied by a control valve with a selectively changeable output cross-section, which is acted upon by constant pressure and a supercritical pressure ratio so that the valve position is a precise measure of the supplied quantity of gas. The additional quantity of gas necessary for suitable regulation is small and is generally approximately 20% of the overall quantity of carrier gas with a regulation range of 0-40%.

FIG. 2 shows a further preferred embodiment in which, contrary to the device shown in FIG. 1, carrier gas which enters a cyclone 24 through constriction 21 via conveyer pipe line 20 is removed via discharge pipe 25.

The solid particle-gas suspension enters cyclone 24 tangentially so that the solid particles collect in the wall area and carrier gas which is free of solid particles to a great extent may be removed via central discharge pipe 25.

After cyclone 24, the suspension passes constriction 22 and is directed to its destined purpose via outlet 38.

The removed quantity of carrier gas passes control valve 26, whereby aperture cross-sectional area 37 of the valve may be varied, and is fed back to the main quantity of carrier gas via gas pipe 23 after constriction 22.

The pressures are measured at measuring points 34, 35 and 36, displayed at manometers 31, 32, 33 and the values fed to computer 30. Regulator 29 compares the feedback value transmitted by the computer with the desired value and controls control valve 26 via actuator 27. The corresponding information reaches computer 30 via adjustment transmitter 28.

The aperture cross-sectional areas of constrictions 21 and 22 are preferably identical, but may also be different.

The preferred device shown can only be used for measuring the mass flow of the solid particles. It suffices for this purpose to remove a constant quantity of gas via discharge pipe 25 and the control devices shown may be dispensed with.

It has been found that the mass flow of the solid particles obeys the following relation in this device:

$$\dot{m} = \sqrt{2\rho P_o \frac{p}{p_2} (\Delta p_1 - \Delta p_2) \cdot \frac{q_1^2}{q_2}}$$

In this equation, $\rho$ is the density [kg/m$^3$] of the carrier gas. The other quantities correspond to those in the relation for the first embodiment, p being in this case the pressure at measuring point 35, $\Delta p_1$ the pressure difference between measuring points 34 and 35 and $\Delta p_2$ the pressure difference between measuring points 34 and 36.

The inventive device is suitable for measuring and regulating the mass flow of solid particles in a great variety of pneumatic conveying systems.

One particular area of application is for blowing coal dust into blast furnaces. This necessarily requires great readiness for service since the blast furnace does not tolerate any interruption in the coal supply. On the other hand, the device should not have an elaborate construction, as is particularly important when each tuyere is charged separately.

Blowing in coal usually involves densities on the order of 5-50 kg/m$_n^3$, and normally approximately 20 kg/m$_n^3$. The feed pressures are usually between 5 and 10 bar. The flow rate depends on the grain size. Usual dusts have a grain size of approximately 0.2 mm.

When supplying coal dust to a blast furnace using air as a carrier gas, only one flow control can be provided for all nozzles, in which case constant quantities of removed or supplied carrier gas are worked with. Only the actual mass flow for each nozzle is then indicated.

It is also possible to cause equal distribution over the nozzles. The quantity of removed or supplied carrier gas is then regulated so that the mass flow becomes constant for all nozzles.

Finally, the desired value of the mass flow of the coal may be made dependent upon the wind acceptance.

I claim:
1. A method of measuring and regulating mass flow of particles in a transported solid particle-gas suspension through a conveyor pipeline having a first constriction and a second constriction downstream of said first constriction and a gas pipe connected to said conveyor pipeline between said two constrictions, comprising the steps of:
   (a) changing the quantity of the carrier gas in said suspension by removing or supplying carrier gas through said gas pipe;
   (b) measuring a first pressure differential across the first constriction and a second pressure differential across the second constriction;
   (c) determining the mass flow rate, in mass units per time units, of the transported particles responsive to the difference between the first and second pressure differential in accordance with the relationship

$$\dot{m} = \frac{2p \cdot q^2}{p_o v_o} (\Delta p_2 - \Delta p_1)$$

where
$\dot{m}$ is mass flow rate (mass/time),
p is initial pressure,
q is a cross-section of said constrictions,
$p_o$ is normal pressure,
$v_o$ is the amount of carrier gas transmitted through said pipe and
($\Delta p_2 - \Delta p_1$) is the difference between the second and first pressure differential.

2. A method as claimed in claim 1 wherein said step (a) is effected by supplying gas through said gas pipe.

3. A method as claimed in claim 1 wherein said step (a) is effected by removing gas through said gas pipe.

4. A method as claimed in claim 3, wherein carrier gas removed in said step (a) is returned to the suspension downstream of the second constriction.

5. A method as claimed in claim 1 further comprising the step of regulating the mass flow of the solid particles by changing the quantity of carrier gas supplied or removed through said gas pipe.

6. A method as claimed in claim 1, wherein a quantity in the range of 5–50% of carrier gas by volume is supplied or removed through the gas pipe.

7. A device for measuring and regulating the mass flow of solid particles in a transported solid particle-gas suspension, comprising:
   a conveyor pipeline for transporting said solid particle-gas suspension;
   a gas pipe connected to said conveyor pipeline for removing or supplying carrier gas from or to, respectively, said conveyor pipeline at a predetermined position;
   a first constriction in said conveyor pipeline upstream of said predetermined position;
   a second constriction in said conveyor pipeline downstream of said predetermined position;
   first means responsive to a pressure drop across said first constriction for measuring the pressure drop across said first constriction; and
   second means, responsive to a pressure drop across said second constriction, for measuring the pressure drop across said second constriction; and
   means for determining the difference between the pressure drops across the first and second constrictions and the mass flow rate, in units of mass per time, of the solid particles, responsive to said first means and second means in accordance with the relationship $$\dot{m} = \frac{2p \cdot q^2}{p_o v_o} (\Delta p_2 - \Delta p_1)$$

where
$\dot{m}$ is mass flow rate (mass/time),
p is initial pressure,
q is a cross-section of said constrictions,
$p_o$ is normal pressure,
$v_o$ is the amount of carrier gas transmitted through said pipe,
$(\Delta p_2 - \Delta p_1)$ is the difference between both said pressure drops.

8. A device as claimed in claim 7, wherein said first and second constrictions comprise restrictors.

9. A device as claimed in claim 7, wherein said first and second constrictions comprise slits.

10. A device as claimed in claim 7, further comprising a filter interposed between said gas pipe and said conveyor pipeline, said filter being permeable to gas.

11. A device as claimed in claim 7, wherein said conveyor pipeline opens out into a cyclone.

12. A device as claimed in claim 7, further comprising means, connected to said gas pipe and also connected to said conveyor pipeline downstream of said second constriction, for reintroducing carrier gas removed through said gas pipe into said suspension downstream of said second constriction.

13. A device as claimed in claim 7, wherein said first and second constrictions have identical cross-sections.

14. A method of measuring and regulating mass flow of particles in a transported solid particle-gas suspension through a conveyor pipeline having two constrictions and a gas pipe connected to said conveyor pipeline between said two constrictions, comprising steps of:
   (a) measuring a pressure drop across one of said constrictions;
   (b) measuring a pressure drop across the other of said constrictions;
   (c) calculating solid particle mass flow rate, in mass units per time units, on the basis of a difference in said pressure drops measured in said steps (a) and (b) in accordance with the relationship $$\dot{m} = \frac{2p \cdot q^2}{p_o v_o} (\Delta p_2 - \Delta p_1)$$

where
$\dot{m}$ is mass flow rate (mass/time),
p is initial pressure,
q is a cross-section of said constrictions,
$p_o$ is normal pressure,
$v_o$ is the amount of carrier gas transmitted through said pipe,
$(\Delta p_2 - \Delta p_1)$ is the difference between the second and first pressure drops.

15. A device for measuring and regulating the mass flow of solid particles in a transported solid particle-gas suspension, comprising:
   a conveyor pipeline for transporting said suspension;
   a gas pipe connected to said conveyor pipeline for changing the amount of carrier gas for said suspension;
   a first constriction upstream of said gas pipe;
   a second constriction downstream of said gas pipe;
   first gauge means responsive to a pressure drop across said first constriction for measuring the pressure drop across said first constriction;
   second gauge means responsive to a pressure drop across said second constriction for measuring a second pressure drop across said second constriction;
   control means, responsive to said first and second gauge means, for calculating a solid particle mass flow rate, in units of mass per time, on the basis of said first and second pressure drops in accordance with the relationship $$\dot{m} = \frac{2p \cdot q^2}{p_o v_o} (\Delta p_2 - \Delta p_1)$$

where
$\dot{m}$ is mass flow rate (mass/time),
p is initial pressure,
q is a cross-section of said constrictions,
$p_o$ is normal pressure,
$v_o$ is the amount of carrier gas transmitted through said pipe,
$(\Delta p_2 - \Delta p_1)$ is the difference between the second and first pressure drops.

* * * * *